United States Patent [19]

Mallinson

[11] Patent Number: 4,893,907
[45] Date of Patent: Jan. 16, 1990

[54] OPTICAL DEVICES

[75] Inventor: Stephen R. Mallinson, Ipswich, England

[73] Assignee: British Telecommunications Public Limited Company, United Kingdom

[21] Appl. No.: 130,462

[22] PCT Filed: Mar. 31, 1987

[86] PCT No.: PCT/GB87/00217
§ 371 Date: Nov. 30, 1987
§ 102(e) Date: Nov. 30, 1987

[87] PCT Pub. No.: WO87/06019
PCT Pub. Date: Oct. 8, 1987

[30] Foreign Application Priority Data
Apr. 4, 1986 [GB] United Kingdom ................ 8608276

[51] Int. Cl.$^4$ ............................................ G02F 1/13
[52] U.S. Cl. ............................ 350/350 S; 350/351; 350/347 V
[58] Field of Search ............... 350/350 S, 351, 347 E, 350/347 V

[56] References Cited

U.S. PATENT DOCUMENTS

| | | | |
|---|---|---|---|
| 3,796,999 | 3/1974 | Kahn | 350/351 |
| 3,963,310 | 6/1976 | Giallorenzi et al. | |
| 4,196,974 | 4/1980 | Hareng et al. | 350/350 S |
| 4,201,442 | 5/1980 | McMahon et al. | |
| 4,240,712 | 12/1980 | Thirant | 350/350 S |
| 4,563,059 | 1/1986 | Clark et al. | |
| 4,763,992 | 8/1988 | Takada et al. | 350/350 S |

FOREIGN PATENT DOCUMENTS

| | | | |
|---|---|---|---|
| 0092181 | 10/1983 | European Pat. Off. | |
| 0168973 | 1/1986 | European Pat. Off. | |
| 0103063 | 8/1979 | Japan | 350/350 S |
| 0087535 | 5/1983 | Japan | 350/350 S |
| 0118725 | 6/1986 | Japan | 350/350 S |

OTHER PUBLICATIONS

Patents Abstracts of Japan, vol. 9, No. 224, (P-387) (1947), 10 Sep. 1985, see the whole document & JP.A. 6083009 (Mitsubishi Denki K.K.) 11 May 1985.

Optics Letters, vol. 5, No. 4, Apr. 1980, Optical Society of America, N.Y., U.S.), RA Soref et al.: "Total Switching of Unpolarized Fiber Light With a Four-Port Electro-Optic Liquid-Crystal Device", pp. 147-149, see the whole document.

Kahn F. J.; Applied Physics Letters, vol. 22, p. 11, 1973.

Taylor, G. N.; Kahn, F. J.; Journal of Applied Physics, vol. 45, p. 4330, 1974.

Steers, M., Mirceau-Roussel, A.; Journal de Physics; vol. 37, p. C-3-145, 1976.

Dewey, A. G., Jacobs, J. T., Huth, B. G.; Proceedings SID, 19/1, p. 1, 1978.

Sasaki, A., Inoda, M., Ishibashi, T.; Proceedings SID, 21/4, p. 341, 1980.

Patel, J. S., Leslie, T. M., Goodby, J. W.; Ferroelectrics, 59, p. 137, 1984.

Sheridan, J. P., Giallorenzi, T. G.; Journal of Applied Physics, vol. 45, p. 5160, 1974.

Giallorenzi, T. G., Weiss, J. A., Sheridan, J. P.; Journal of Applied Physics, vol. 47, p. 1820, 1976.

Soffer et al.; Proceedings SPIE, 218, 81, 1980.

Primary Examiner—Stanley D. Miller
Assistant Examiner—Anita Pellman Gross
Attorney, Agent, or Firm—Nixon & Vanderhye

[57] ABSTRACT

A liquid crystal device (5) having smectic phase liquid crystal material in two transparent states of differing molecular orientation, each state presenting a different refractive index to polarized light transmitted therethrough, may be utilized to perform various optical functions. For example, switchable waveguides (6, 7) a ring resonator or a diffraction grating may be produced by appropriate arrangement of the material in the two states.

23 Claims, 5 Drawing Sheets

OPTICAL DEVICES

The present invention relates to optical devices using liquid crystal material. Liquid crystal materials are liquids which exhibit the long range molecular order characteristic of crystals although they are in the liquid state. They display marked changes in their optical properties with changes of their temperature or in response to an applied electric field. These are three predominant meso-phases which may exist between the solid and isotropic liquid states and these are, in the order in which they generally occur with ascending temperature, the smectic, nematic and cholesteric phases. Not all liquid crystal materials exhibit all phases. In a common application of liquid crystal materials they are used to produce display devices for electronic calculators and portable computers. In addition, two-dimensional arrays of liquid crystal elements have been used to produce displays of images and also of television pictures.

With the advent of optical waveguides to convey information signals a need has arisen for optical devices which can be controlled electrically. To this end an attempt has been made to produce a light channel using liquid crystal material in the nematic phase. However, it was found that the channel imposed a loss of about 30 d8/cm on the light propagated through it which was considered to be unacceptable. It has also been noted that the propagation loss of light through an aligned smectic A liquid crystal material is much lower at about 2 d8/cm, but proposals have been made for display devices using such material in light scattering and transparent forms.

It is an object of the present invention to provide optical devices using liquid crystal material in the smectic phase.

According to one aspect of the present invention there is provided a liquid crystal device having smectic phase liquid crystal material in two transparent states of differing molecular orientation, thereby to present differing refractive indices to polarised light transmitted through the device.

According to a second aspect of the present invention there is provided an optical waveguide structure having a liquid crystal device with smectic phase liquid crystal material in two transparent state of differing molecular orientation, so that a part of the material in one state forms an optical waveguide for polarised light having a plane of polarisation related to the molecular orientation of the particular part and a part of the material in the other state abuts the part in the one state to form a boundary of the optical waveguide.

Optical waveguides may be connected to such a structure by being brought to the periphery of the cell containing the material and means, for example a laser, may be used to effect the change in state of the material along a line joining a point on the periphery of the cell where the guide selected as the input waveguide meets it to another point on the periphery of the cell where the waveguide selected as the output waveguide meets it. Alternatively, the waveguides joining the liquid crystal material may be used to link from and/or to waveguides embodied in the major walls of the cell and produced, for example, by ion exchange. The waveguides written into the liquid crystal material may be arranged as field couplers, ring resonators, or other waveguide circuit components.

According to a third aspect of the present invention there is provided an optical component including a liquid crystal device with smectic phase liquid crystal material in two transparent states of differing molecular orientations, the shapes of the parts in the two states being arranged to produce a required effect on polarised light transmitted through the device.

According to a fourth aspect of the present invention there is provided an adjustable optical component including a liquid crystal device with smectic phase liquid crystal material in two transparent states of differing effective refractive indices to polarised light, the boundary between the parts in the different states determining the effect of the component on polarised light transmitted through it, in which the position of the boundary is changeable by selective alteration of the states of at least some of the liquid crystal material, thereby to alter the effect of the component on the light transmitted through it.

The two states of the liquid crystal material have different molecular orientation and by virtue of the birefringence of the material it can present different refractive indices to light polarised in a particular plane. The two molecular orientations may be orthogonal and the plane of polarisation of the light may be chosen to be parallel to the molecules of the material in one state and perpendicular to the molecules of the material in the other state.

The two states may both have homogeneous alignment of the molecules, that is to say the molecules are parallel to the major bounding planes of the cell containing the material, and preferably the molecules in one state are perpendicular to the molecules in the other state. Light polarised parallel to the major bounding planes and passing through the liquid crystal material between the major bounding planes will encounter a higher refractive index where it meets the molecules of the material transversely than where it meets the molecules end on. At least, this is the effect for most liquid crystal materials, although there are materials for which the effect is reversed. By making the region of higher refractive index a passage bounded by regions of lower refractive index, the first-mentioned region will act as a guide for the polarised light. Other configurations of the regions can be produced so as to provide other optical components.

In another example one of the states may have homogeneous alignment of the molecules and the other state may have homeotropic alignment of the molecules in which the molecules stand perpendicular to the major bounding planes. In this case light passing through the material between the major bounding planes may be polarised either parallel or perpendicular to the major bounding planes and will encounter different refractive indices in the material, depending on the alignment of the molecules relative to plane of polarisation of the light as described above and components having adjustable optical properties may be constructed, the adjustment being effected by changing the state of some of the liquid crystal material.

Instead of being directed through the material between the major bounding planes, the polarised light may be directed roughly normally to the major bounding planes, and the regions of differing refractive indices may be in closely spaced parallel lines thereby providing a diffraction grating, so that the light is diffracted and a part of it leaves the component in a predetermined direction. The spacing of the lines of the grating and their orientation can be altered by converting all the liquid crystal material to the same state and then regenerating the regions of different refractive index as lines in the orientation and with the spacing required.

Liquid crystal material in the smectic A phase is highly viscous with the molecules aligned in parallel, and in each plane the long axes of the molecules are perpendicular to the plane. As mentioned above, smectic A liquid crystal material may be arranged to have two alignments relative to the major bounding planes of the cell, homogeneous and homeotropic. In homogeneous alignment the long axes of the molecules are parallel to the major bounding planes, so that different homogeneous alignments are apparently possible depending on the orientation of the molecules, but in practice the orientation of the molecules is determined by the surface treatment of the major bounding planes, so that there is only one practical homogeneous alignment. In homeotropic alignment the long axes of the molecules are perpendicular to the major bounding planes and only one homeotropic alignment is possible.

If a liquid crystal material is heated to above a certain critical temperature, depending on the material, it is converted to an isotropic liquid phase in which it displays none of the properties characteristic of liquid crystal material. The isotropic liquid can be converted back to smectic A phase by cooling slowly. Homeotropic alignment can be achieved by the use of a surfactant on the major bounding planes; Dow-Corning XZ 2-2300 or cetyl-trimethyl-ammonium-bromide could be used as the surfactant. Other surface treatments of the major bounding planes such as the oblique deposition of silicon oxide, or the use of certain polymers, e.g. polyvinyl alcohol, rubbed in the alignment direction required encourage homogeneous alignment of the material. If the liquid crystal material is cooled slowly from the higher temperature isotropic or nematic phases, for example, into the smectic phase, the material will then adopt the corresponding homeotropic or homogeneous alignment.

In one example of the invention, the molecules of homogeneously aligned material are first poled to a homeotropic alignment using a strong electric field at right angles to the molecules and perpendicular to the major bounding plane. This poling causes the material to become aligned homeotropically, i.e. in the direction of the poling electric field. The elastic field does not need to be permanently applied since the poled state is stable in the absence of external perturbations. In this state if a part only of the material is heated out of the smectic phase and then allowed to cool slowly (with or without a weak electric field aligned with the original orientation of the molecules), the part resumes the homogeneously aligned state in the original orientation so that this part of the material is homogeneously aligned whilst the other part remains homeotropically aligned as a result of the poling. The localised heating may be provided by a well focused beam from a laser (e.g. a helium-neon laser) which could produce a narrow line of the differently orientated material in the poled material. This narrow line could be used as a waveguide, possibly a single mode waveguide if the line were narrow enough, for light polarised so that the differently orientated material had a higher apparent refractive index than the remainder. Total erasure of narrow lines written in this way, or any other configurations of differently orientated material, could be achieved by the re-application of the poling electric field. Erasure of only part of the differently orientated material would be obtained by reheating that part to the critical temperature (again using a laser for example) and then allowing it to cool slowly in a weak electric field in the same direction as the poling field. The configuration produced by this process is stable provided that the material is not heated or subjected to strong electric fields.

A waveguide similar to that just described but of homeotropically aligned material bounded by homogeneously aligned material would be produced, also starting from a homogeneously aligned cell but in this case the poling of the cell is omitted. Where the alignment of the material is to be changed to homeotropic, the material is locally heated to the isotropic phase and again a laser would be suitable for causing the local heating with the spot of light being moved over the cell along the patch required for the waveguide. Whilst the material is being locally heated a weak transverse electric field from one major surface of the cell to the other is applied to the material, with the result that as it cools again to the smectic phase it assumes homeotropic alignment. The transverse electric field may be applied using transparent electrodes of, for example, indium tin oxide, on the inner surfaces of the major bounding planes. The electrodes may extend over the entire area of the major bounding planes or may be more limited in extent. It would be possible to use a selectively applied electric field to determine the shape of the part of the cell which is changed to homeotropic alignment, in conjunction with selectively applied local heating by laser, or with more generally applied heating.

It would, of course, be possible to draw a waveguide in a negative way by writing two lines of the differently orientated material to bound a line of the unmodified, possibly poled material which acts as the waveguide. In this case, the polarisation of the light would need to be chosen so that the unmodified material presented a higher apparent refractive index than the differently orientated material.

A similar component can be made starting from homeotropically aligned material and then switching it to homogeneous alignment by the use of strong electric field. Localised heating, by laser for example, with or without a weak electric field could be used to change part of the material back to homeotropic alignment.

In this specification it will be readily apparent to those skilled in the art that references to a strong electric field means sufficiently strong to pole the liquid crystal material into alignment with the field in the smectic phase. References to a weak electric field imply that the field is not strong enough to cause poling directly in the smectic phase, but is sufficiently strong to cause poling when the liquid crystal material is heated out of the smectic phase into the nematic or isotropic phases, for example, and is then allowed to cool back into the smectic phase. The absolute values of field strengths required for a particular liquid crystal material will be readily determinable by the skilled person by established methods not requiring further explanation here.

It should be noted that liquid crystal material of positive refractrive index anisotropy having its molecules lying in the plane of polarisation of a light beam and transverse to its direction of propagation presents a higher refractive index to that light beam than the same material having its molecules aligned with the direction of propagation of the beam or at right angles to its plane of polarisation. For liquid crystal material having negative refractive index anisotropy the relationship between the values of the apparent refractive indices is reversed.

There is an advantage in using a waveguide of homeotropically aligned material bounded by homogeneously aligned material over using a waveguide of homogeneously aligned material bounded by homeotropically aligned material, and that is that if the waveguide follows a curved path or is required to have different orientations in the cell, then the waveguide of homeotropically aligned material can be arranged to present a higher refractive index to suitably polarised light than would homogeneously aligned material to the same light regardless of the direction of propagation of that light in the plane of the cell. On the other hand, with a waveguide of homogeneously aligned material the plane of polarisation of the light usually needed for it to have the higher refractive index means that the waveguide cannot maintain that higher refractive index when its direction across the cell becomes parallel to the molecular alignment of the homogeneously aligned material.

Using such processes various optical components can be constructed. For example a waveguide could be drawn from one point on the periphery of the cell to another, then erased and a second waveguide drawn between two further points on the periphery. An optical "switch" could be produced enabling each of one or more input optical waveguides, such as fibre optic guides, brought to a point on the periphery of the cell to be selectively connected to one or more output optical waveguides joined to the periphery of the cell by drawing and erasing waveguides in the cell as required.

Another component which could be produced is a diffraction grating. This could take two forms, one consisting of a plurality of parallel lines of the differently orientated material drawn in the liquid crystal material by the method described above, for example, and the other consisting of a line of spaced dots of the differently orientated material. For the first-mentioned form a light beam would be applied to the grating through one major bounding plane and the diffracted beam would pass out through the other major bounding plane. For the second-mentioned form the light beam would be applied through the liquid crystal material parallel to the major bounding planes towards one side of the line of dots and the diffracted beam would leave the line of dots from the other side.

An optical component using lenses could be reproduced in two-dimensional form using one or more parts of the appropriate convex and concave lens shapes having the higher effective refractive index. Components having similar properties could be produced using oppositely lens shaped parts having the lower effective refractive index. Such larger areas of changed material may be produced using a laser giving a large spot of light instead of a finely focussed point of light and/or with the use of shaped electrodes for selectively applying an electric field to the material.

Similarly, the liquid crystal material may be formed to have two parts of different apparent refractive indices meeting along a straight line oblique to the path of a beam of polarised light which is therefore refracted at the interface. The angle of the interface to the beam may be adjusted by the technique described above to give different angles of refraction of the beam.

Since the refractive index of the material is dependent on the direction of the plane of polarisation of the light propagating through it relative to the molecules of the material, the plane of polarisation of the light can be changed to alter the function of an optical component according to the invention in a desired manner. Moreover, light signals of two orthogonal plane of polarisation may be transmitted simultaneously through such a component and the two signals would be treated differently by the component.

Suitable liquid crystal materials are available from manufacturing chemists and it is possible to specify up to a point the operating temperature range in which the material is in the smectic phase. A typical temperature range might be 0°–30° C. If a device according to the invention is to be exposed to a wide variation in temperature a thermostatically controlled heater and/or cooler should be provided to keep it within the operating temperature range.

The liquid crystal material may be dyed to improve the absorption of energy from a laser or other light source used to heat the material to change its state. The dye should be chosen so as not to attenuate the light to be propoagated through the resulting device. For example, a red dye may be used if the light to be propagated is red from a helium-neon laser, for example, and in this instance an argon ion laser producing blue light which is strongly absorbed by the dye may be used to heat the material instead of the helium-neon laser as mentioned earlier.

In order that the invention may be fully understood and readily carried into effect it will now be described with reference to the accompanying drawings, of which.

Figure 1:
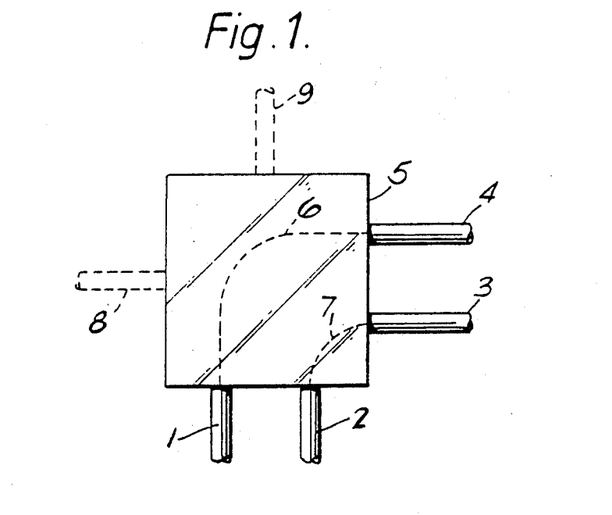
FIGS. 1 and 2 show a first example of the device according to the invention.
Figure 2:
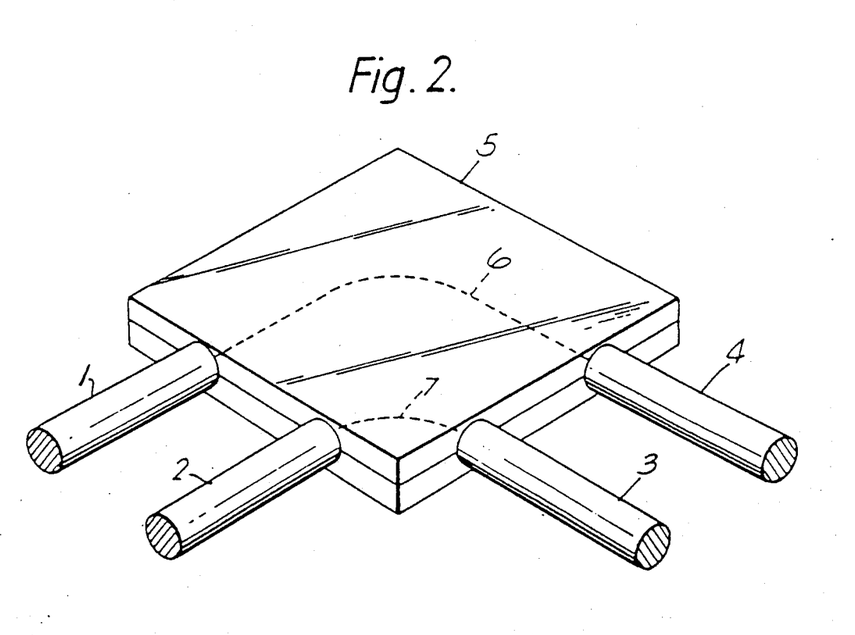

Referring now to FIGS. 1 and 2, four light waveguides 1, 2, 3 and 4 are joined to places on the periphery of a liquid crystal cell 5 of smectic A phase material. In the cell 5 there is drawn a waveguide 6 by one of the methods described above, for example by the use of a laser, the guide 6 joining the places where the waveguides 1 and 4 meet the periphery of the cell 5. Light propagated along the guide 1 will be conveyed by the guide 6 to the guide 4. A second waveguide 7 is shown in FIG. 1 joining the waveguides 2 and 3. If it were required to join the waveguide 1 to the waveguide 3, then the cell 5 would be heated or subjected to a strong electric field to erase the guides 6 and 7 after which a new guide could be drawn joining the waveguide 1 to the waveguide 3 by means of a laser, for example. Other waveguides 8 and 9 shown in FIG. 1 could abut the periphery of the cell 5 and could be selectively connected to the other waveguides abutting the cell by guides drawn in the material of the cell itself. Since the refractive index of the liquid crystal material depends on the direction of the polarisation of the light, suitably aligned polarisers may be located where the external waveguides abut the periphery of the cell. Suitable matching interfaces should also be provided where the light waveguides 1, 2, 3 and 4 are joined to the cell 5 to reduce the attenuation of the light transmitted due to changes in the refractive index of the material through which the light is propagating.

The interfaces may include lenses or other imaging optics at the ends of the waveguides as well as anti-reflection coatings.

Figure 3A:
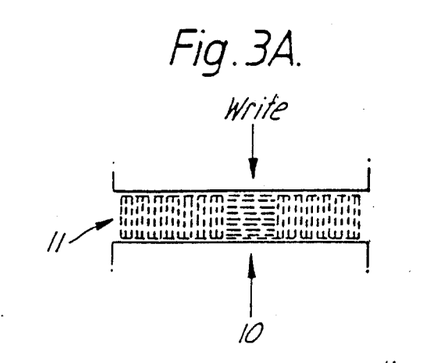
FIGS. 3A, 3B and 3C are diagrams showing alternative possibilities for the liquid crystal material used in the example of FIG. 1 to form a waveguide linking two other waveguides.
Figure 3B:
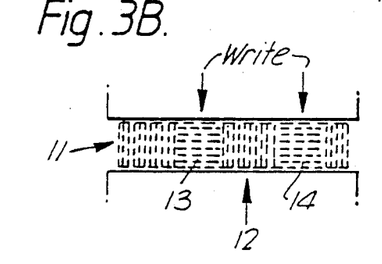
Figure 3C:
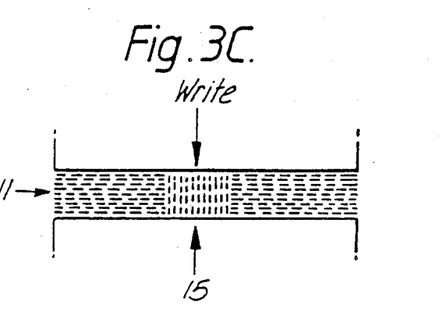

The waveguides in the cell 5 may be drawn in three ways which are shown in diagrammatic form in FIGS. 3A, 3B and 3C. In FIG. 3A, the guiding region 10 of the liquid crystal material 11 is formed by changing the state in the region 10, of the originally homogeneously aligned material, poled to be homeotropically aligned, to be again homogeneously aligned in the region 10 by writing with a laser deflected along the path required for the waveguide. The light would of course be so polarised that the refractive index presented to the light of the guiding region 10 is higher than that of the remainder of the material which bounds it. FIG. 3B shows a method of forming a guiding region 12 of homeotropically aligned material bounded by bordering regions 13 and 14 in which it is the bordering regions 13 and 14 which are of homogeneously aligned material whilst the remainder of the liquid crystal material 11 is homeotropically aligned. The two regions 13, 14 one on each side of the guiding region 12 are written by deflecting the laser along the two substantially parallel paths so that the unmodified guiding region 12 between them can act as a light waveguide.

In FIGS. 3A and 3B, the liquid crystal material is initially homogeneously aligned and the whole of it is then poled by the application of a transverse electric field to be homeotropically aligned. As indicated in the Figures, this leaves a boundary layer of molecules adjacent the major bounding planes which remain in homogeneous alignment. This has the result that the cell of liquid crystal material is effectively homeotropically aligned and selected regions of it are restored to homogeneous alignment.

In FIG. 3C, the starting state of the liquid crystal material is again homogeneous whilst the guiding region is homeotropic. However, in this case, the homeotropic guiding region 15 is formed by the selective application of local heating whilst a weak transverse electric field is applied generally or selectively to the material. Alternatively, a guiding region of homogeneously aligned material could have been made by writing two closely spaced lines of homeotropic material in the cell similar to the arrangement illustrated in FIG. 3B.

Figure 3D:
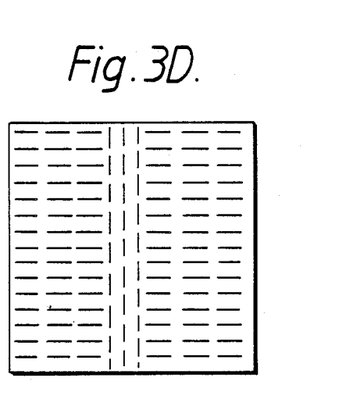
FIGS. 3D and 3E are diagrams illustrating plan and end views respectively of an embodiment wherein the liquid crystal material is interposed between two major bounding surfaces and the mutually orthogonal orientations in the two transparent states are both homogeneously aligned substantially parallel to the major bounding surfaces.
Figure 3E:
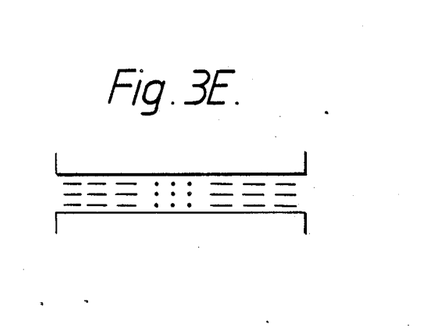

In FIGS. 3D and 3E, plan and end views of another exemplary embodiment are shown in which the liquid crystal material is nterposed between two major bounding surfaces and the mutually orthogonal orientations in the two transparent states are both homogeneously aligned substantially parallel to the major bounding surfaces.

The deflection of the light spot from the laser may be achieved by the use of one or more mirrors rotated by an electro-mechanical arrangement having one or more moving coils mounted for rotation in a magnetic field. Alternatively commercially available acousto-optic beam deflectors may be used.

Figure 4A:
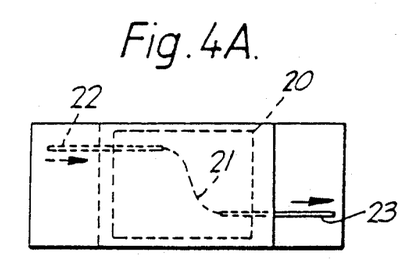
FIGS. 4A and 4B are diagrams of the plan and sideviews of an alternative to the device shown in FIG. 1 in which a waveguide written in liquid crystal material is used to link input and output waveguides embedded in the bounding planes.
Figure 4B:
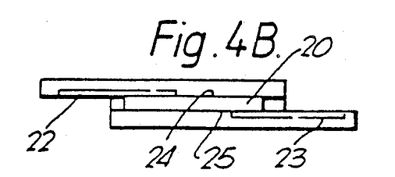

The device shown in FIGS. 4A and 4B is similar to that shown in FIGS. 1 and 2 except that in this case a written guide 21 in a liquid crystal cell 20 is used to join an input guide 22 to an output guide 23 which meet the cell 20 on its major faces 24 and 25 instead of at places arranged on the periphery of the cell. The waveguides 22 and 23 may be produced by ion exchange, e.g. the sodium-silver process, in the walls of the cell. Either of the forms of guide shown in FIGS. 3A and 3B may be used in this example and of course other input and output waveguides could be provided so that the device could be used as a waveguide switch.

Figure 5:
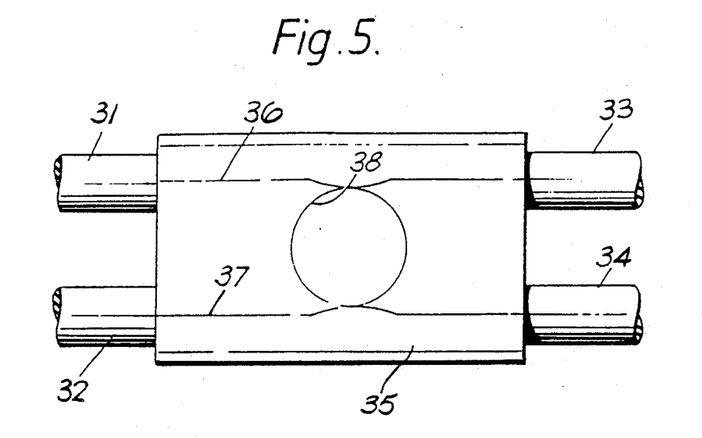
FIG. 5 is a diagram of a ring resonator which could be formed in accordance with the present invention.

The guides drawn in the liquid crystal cell are not limited to being simply switchable from one position to another, but could be constructed in the form of evanescent field couplers, ring resonators or other passive optical components. In FIG. 5, four external waveguides 31, 32, 33 and 34 are connected to places on the periphery of a cell 35, and guiding regions 36 and 37 are written in the material of the cell 35 by one of the methods described above and a closed guiding ring 38 is written coupling together the regions 36 and 37.

Figure 6:
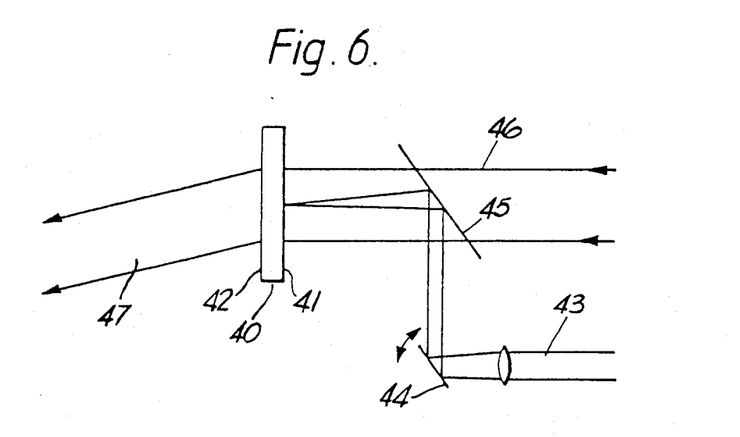
FIG. 6 is a diagram illustrating one way in which a diffraction grating according to the present invention could be produced.

Another possibility for the regions of different refractive index in the material of the cell is to cause a plurality of parallel lines to be drawn in the material of the cell so that it acts as a diffraction grating for light entering the cell through one of its major faces and leaving it through the other. FIG. 6 is a diagram of such an arrangement in which a cell 40 having major faces 41 and 42 has lines written in it parallel to each other going in and out of the plane of the paper by a write beam 43 which is deflected backwards and forwards across the cell by a scanning mirror 44. The write beam is reflected onto the cell by a partially transmissive mirror 45 through which mirror a signal light beam 46 can pass to the cell 40. An output light beam 4 leaves the cell 40 at an angle to the signal beam 46 due to the diffraction effect of the lines drawn in the cell 40.

Figure 7:
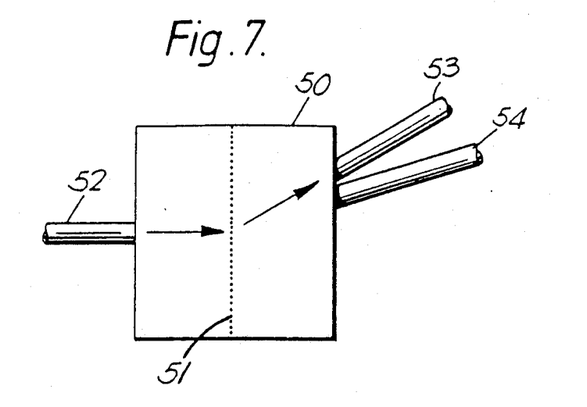
FIG. 7 shows an alternative construction for a diffraction grating.

The diffraction grating effect could also be used in the plane of the cell by writing a line of suitably spaced dots across the cell. This is shown diagramatically in FIG. 7 in which a cell 50 is provided with a line 51 of dots across the centre and light from an input guide 52 meeting the cell at one place on its periphery is deflected to an output guide 53 at a place on the opposite side of the cell. This device could be used as an optical switch by changing the size and spacing of the dots so that the light could alternatively be deflected to another output waveguide 54. Means should be provided to ensure that the light propagating within the cell can pass to the output waveguides without being reflected back into the cell.

Figure 8:
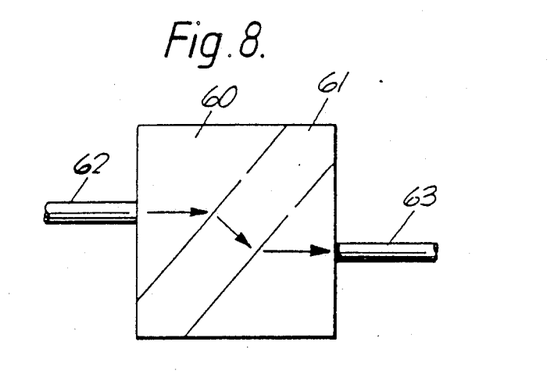
FIGS. 8 and 9 show the use of regions of different refractive index produced in accordance with the present invention for refracting light propagating in a liquid crystal cell.
Figure 9:
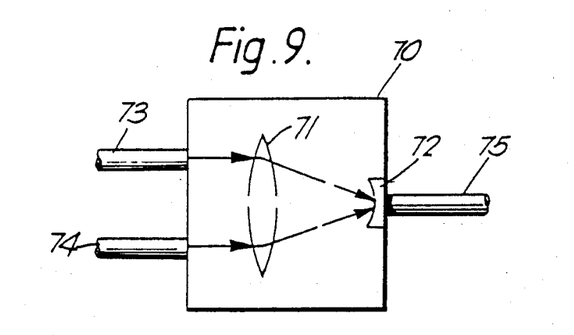

If larger regions than the narrow lines and dots referred to above are changed in state in the liquid crystal cell, then use may be made of the refraction of light propagating in the cell. FIG. 8 shows a cell 60 having a band 61 of higher refractive index formed in it which is used to deflect light from an input waveguide 62 to an output waveguide 63. In FIG. 9, a cell 70 has a convex lens shaped region 71 of higher refractive index formed in it and a second concave lens shaped region 72 formed at one edge. Light from input waveguides 73 and 74 enters the cell and is refracted by the region 71 to the region 72 where the light leaves by an output waveguide 75.

Although the invention has been described with reference to planar liquid crystal cells, they need not be planar but may be curved in one or two planes, the change in refractive index between the liquid crystal material and the glass or other material of the bounding surfaces being arranged to effect the light guiding required to keep the light in the liquid crystal material if necessary. Moreover the cell need not be of uniform thickness.

Although the invention has been described with reference to specific examples, many other examples will be apparent to those skilled in the art.

I claim:

1. A liquid crystal device having smectic A phase liquid crystal material in only two transparent states of differing molecular orientation, which present differing respective refractive indices to polarised light transmitted through the device;
    the smectic A phase liquid crystal material in one transparent state having a molecular orientation substantially orthogonal to the material in the other transparent state; and
    the liquid crystal material being interposed between two major bounding surfaces the orientation in one state being homogeneous and substantially parallel to the major bounding surfaces and the orientation in the other state being homeotropic and substantially orthogonal to the major bounding surfaces.

2. A liquid crystal device according to claim 1 wherein a part of the material in one state forms an optical waveguide for polarised light having a plane of polarisation related to the molecular orientation of said part, and wherein a part of the material in the other state abuts the part in the one state to form a boundary of the optical waveguide.

3. An optical component comprising a liquid crystal device according to claim 1 wherein the shapes of the parts in the two states are arranged to produce a required effect on polarised light transmitted through the device.

4. An optical component according to claim 3 wherein the boundary between the parts in the different states determines the effect of the device on polarised light transmitted through it, and wherein the position of the boundary is changeable by selective alteration of the states of at least some of the liquid crystal material, thereby to alter the effect of the component on light transmitted through it.

5. A reconfigurable optical component comprising a liquid crystal device having smectic phase liquid crystal material capable of molecular orientation in two transparent states, said states presenting differing refractive indices to polarised light transmitted through the device, input means for inputting polarised light to the component and means for selectively altering the molecular orientation of at least some of the liquid crystal material, thereby to reconfigure the component.

6. A component according to claim 5 wherein the means for selectively altering the molecular orientation comprises means for locally heating the liquid crystal material out of the smectic phase and means for applying an electric field to the material.

7. A component according to claim 6 wherein the means for locally heating comprises a laser.

8. A component according to claim 5 or 6, wherein the smectic phase liquid crystal material in one transparent state has a molecular orientation substantially orthogonal to the molecular orientation of the material in the other transparent state.

9. A component according to claim 8 wherein the liquid crystal material is interposed between two major bounding surfaces and the mutually orthogonal orientations in the two transparent states are both homogeneously aligned substantially parallel to the major bounding surfaces.

10. A component according to claim 8 wherein the liquid crystal material is interposed between two major bounding surfaces and the orientation in one state is homogeneous and substantially parallel to the major bounding surfaces and the orientation in the other state is homeotropic and substantially orthogonal to the major bounding surfaces.

11. A component according to claim 6 wherein the input means input light into the liquid crystal material in a direction substantially perpendicular to the major bounding surfaces.

12. A reconfigurable optical component comprising:
    a liquid crystal device having smectic phase liquid crystal material disposed between parallel major bounding surfaces and capable of molecular orientation in two transparent states, said states presenting differing refractive indices to polarised light transmitted through the device,
    input means for inputting light to the component, and
    means for selectively altering the molecular orientation of at least some of the liquid crystal material, thereby to reconfigure the component;
    said means for selectively altering the molecular orientation including means for locally heating the liquid crystal material out of the smectic phase and means for applying an electric field to the material; and
    wherein the input means inputs light into the liquid crystal material in a direction substantially parallel to the major bounding surfaces.

13. A method of reconfiguring an optical component having a liquid crystal device with smectic phase liquid crystal material capable of molecular orientation in two transparent states, said states presenting differing refractive indices to polarised light transmitted through the device, input means for inputting light to the component and means for selectively altering the molecular orientation of at least some of the liquid crystal material, thereby to reconfigure the component; said method comprising the
    poling the molecules of the liquid crystal material into a homeotropic alignment by applying a strong electric field substantially perpendicular to the major bounding surfaces;
    removing the strong electric field;
    selectively heating a portion of the homeotropically aligned material out of the smectic phase and allowing that portion to cool back into the smectic phase to assume homogeneous alignment, the portion being selected according to the desired function of the reconfigured component.

14. A method according to claim 13 comprising selectively heating a portion of the liquid crystal material using a laser.

15. A method of reconfiguring an optical component having a liquid crystal device with smectic phase liquid crystal material capable of molecular orientation in two transparent states, said states presenting differing refractive indices to polarised light transmitted through the device, input means for inputting light to the component and means for selectively altering the molecular orientation of at least some of the liquid crystal material, thereby to reconfigure the component; said method comprising the steps of:
   selectively heating a portion of the liquid crystal material out of the smectic phase and allowing that portion to cool back into the smectic phase in the presence of a weak electric field applied perpendicular to the major bounding planes thereby to assume homeotropic alignment,
   the portion being selected according to the desired function of the reconfigured component.

16. A method as in claim 15 further comprising the step of selectively heating a portion of the liquid crystal material using a laser.

17. An optical signal processing device comprising:
   a liquid crystal device having two major bounding surfaces with smectic phase liquid crystal material disposed therebetween in two transparent states of differing molecular orientation presenting respectively different refractive indices to polarised light transmitted therethrough;
   a first portion of said liquid crystal material having a first refractive index;
   optical signal input means disposed to launch polarised optical signals into said first portion;
   optical signal output means disposed to collect polarised optical signals from said first portion; and
   a second portion of said liquid crystal material having a second refractive index located contiguously to said first portion and optically interacting with input polarised optical signals as they pass through said first portion so as to control the path along which said input optical signals pass towards said output means.

18. An optical signal processing device as in claim 17 wherein:
   said input means includes plural first optical fibers;
   said output means includes plural second optical fibers;
   said second refractive index being lower than said first refractive index and said second portion defining at least one optical waveguide path through said first portion between at least one of said first optical fibers and at least one of said second optical fibers.

19. An optical signal processing device as in claim 18 wherein at least one of said optical fibers overlies at least said first portion.

20. An optical signal processing device as in claim 18 wherein at least one of said optical fibers is disposed adjacent and parallel to said first portion.

21. An optical signal processing device as in claim 18 wherein at least one of said first and second portions defines a structure for refracting an input polarised optical signal as it passes therethrough.

22. An optical signal processing device as in claim 21 wherein said structure includes a diffraction grating formed by periodic interruptions in at least one of said first and second portions.

23. An optical signal processing device as in claim 17 further comprising:
   means for electively reconfiguring the first and second portions so as to selectively change the path of input polarised optical signals through said device.

* * * * *